United States Patent
Thivet

[19]
[11] Patent Number: 5,900,172
[45] Date of Patent: May 4, 1999

[54] LIGHTER WITH ILLUMINATING RING ATTACHED TO MASKING SOCKET

[75] Inventor: Gilles Thivet, Labruguiere, France

[73] Assignee: Valeo Vision, Bobigny Cedex, France

[21] Appl. No.: 08/649,727

[22] PCT Filed: Dec. 13, 1995

[86] PCT No.: PCT/FR95/01657

§ 371 Date: Oct. 7, 1996

§ 102(e) Date: Oct. 7, 1996

[87] PCT Pub. No.: WO96/18523

PCT Pub. Date: Jun. 20, 1996

[30] Foreign Application Priority Data

Dec. 13, 1994 [FR] France ................................. 94 15102

[51] Int. Cl.⁶ .................................................. B60N 3/14
[52] U.S. Cl. ............................. 219/267; 362/32; 219/265
[58] Field of Search ..................... 219/260–270; 362/80, 92, 109, 32

[56] References Cited

U.S. PATENT DOCUMENTS

| | | |
|---|---|---|
| 2,701,297 | 2/1955 | Thibault . |
| 4,527,048 | 7/1985 | Comerford et al. . |
| 4,544,226 | 10/1985 | Lupoli et al. . |
| 5,093,554 | 3/1992 | von Gaisberg et al. ................ 219/267 |

FOREIGN PATENT DOCUMENTS

| | | |
|---|---|---|
| 268861 | 6/1988 | European Pat. Off. . |
| 434519 | 6/1991 | European Pat. Off. . |
| 437250 | 7/1991 | European Pat. Off. . |
| 678419 | 10/1995 | European Pat. Off. . |
| 2457787 | 3/1984 | France . |
| 2436939 | 8/1985 | France . |
| 2630057 | 10/1989 | France . |
| 1139159 | 1/1969 | United Kingdom . |

*Primary Examiner*—John A. Jeffery
*Attorney, Agent, or Firm*—Morgan & Finnegan, LLP

[57] ABSTRACT

The lighter body comprises a lighter socket, a masking socket, surrounding the lighter socket and an illuminant ring surrounding the masking socket. The ring has at least one attachment lug of a fixed wall and bears a lighting source. An attachment structure also acts between the ring and the masking socket.

15 Claims, 3 Drawing Sheets

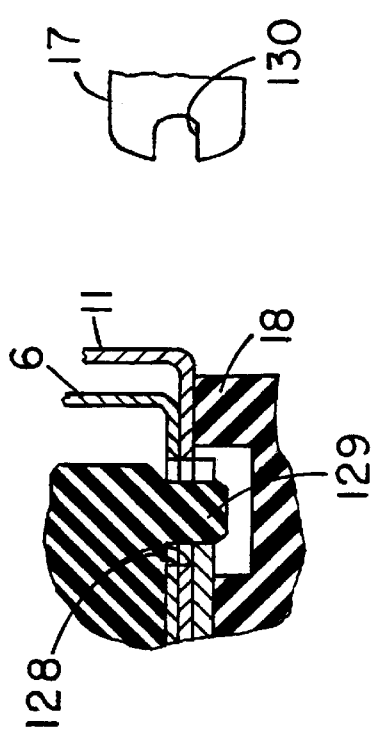
FIG. 6
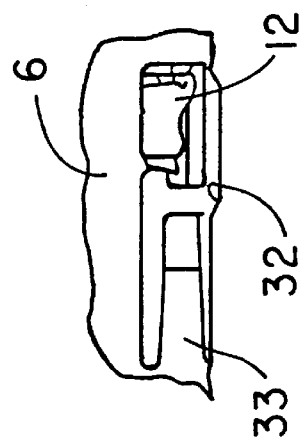
FIG. 4
FIG. 5
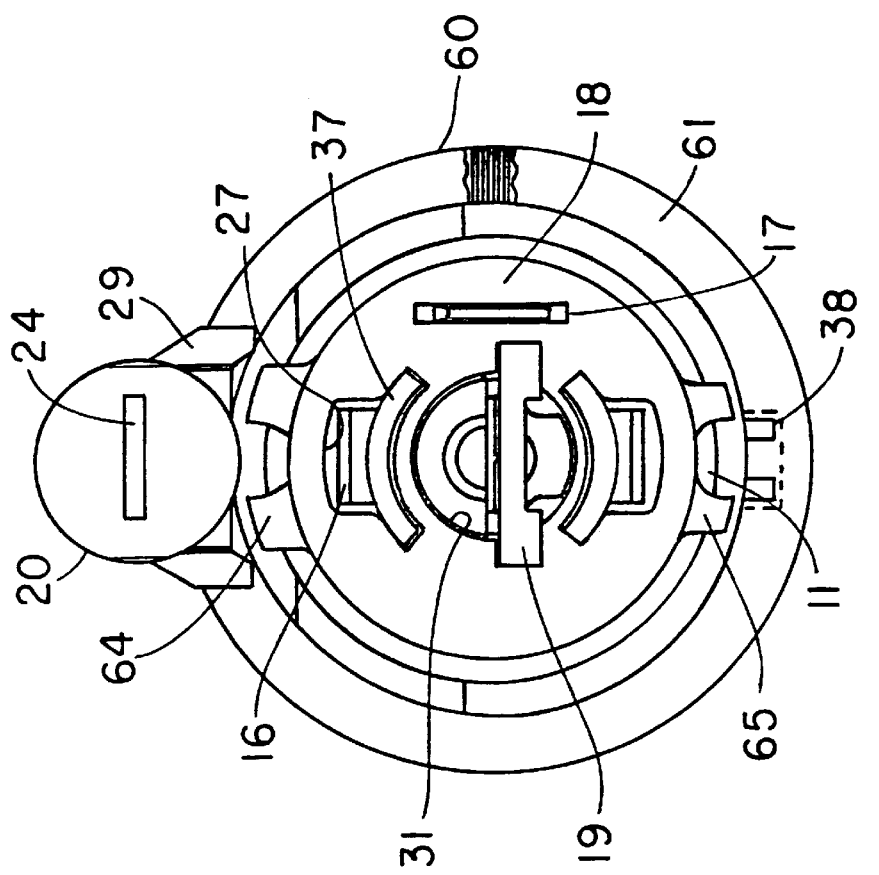
FIG. 3

LIGHTER WITH ILLUMINATING RING ATTACHED TO MASKING SOCKET

BACKGROUND OF THE INVENTION FIELD OF THE INVENTION

The present invention relates to a cigar lighter, especially for a motor vehicle, and the like.

It more particularly relates to the lighter body which such a cigar lighter has.

As is known, the lighter body serves as a receptacle for a removable heating plug equipped with a lighter body to light the cigar or cigarette and comprises an electrically conductive lighter socket, with a bottom, bearing internally with the provision of electrical insulation, by means of an attachment device and a first electrically insulating part, a connecting device normally in the form of a bimetallic strip.

This lighter socket comprises clearance openings opposite the blades of the bimetallic strip, able to be connected to the positive terminal of the voltage source, whereas the lighter socket is able to be connected to the negative terminal of the voltage source.

In practice, the lighter body is installed in a region where a number of wires and/or electric cables exist.

To prevent these wires and cables coming to touch the blades of the bimetallic strip accessible through the clearance openings, in document U.S. Pat. No. 2,701,297, it has already been proposed surrounding the lighter socket by an electrically conductive masking socket also serving for the mounting of the lighter socket.

More precisely the lighter socket is slid into an opening of a fixed wall of the vehicle, such as the dashboard or a console thereof serving for the attachment and the mounting of the lighter body, and is kept captive by means of the masking socket screwed onto a threaded portion borne by the rear end of the lighter socket.

Thus the open front end of the masking socket bears against the rear face of the fixed wall, whereas the open front end of the lighter socket has a generally transversally oriented edge bearing on the front or upper face of an end ring of an illuminant ring, which first ring, by its rear face, bears on the front or upper face of the fixed wall.

This fixed wall is thus sandwiched between the ring of the illuminant ring and the open front end of the masking socket.

As a result the assembly of the masking socket with the lighter socket is performed though the rear of the fixed wall and this assembly of the screw-nut type complicates the production of the sockets.

Furthermore in this document the fixed wall is electrically conductive with the result that the return of the current to the earth is performed by means of the said wall.

This therefore requires the destandardization of the lighter socket. Moreover the masking socket bears a lighting source, with the result that an opening has to be created in the masking socket for the lighting of the illuminant ring.

The object of the present invention is to remove these drawbacks and thus to create, in a simple and economical manner, a lighter body having a standard lighter socket and a simplified masking socket, the assembly of which is performed through the front of the fixed wall.

BRIEF SUMMARY OF THE INVENTION

According to the invention, a lighter body of the above-mentioned type is characterised in that the masking socket has a bottom which is adjacent and electrically connected to the bottom of the lighter socket. The bottom is mounted on the lighter socket by means of the attachment device for this purpose passing, with the provision of electrical insulation, through the bottoms of the lighter and masking sockets. The illuminant ring surrounds the masking socket and has at least one resiliently deformable attachment lug able to come into contact with the rear face of the fixed wall. The attachment means act between the masking socket and the illuminant ring to attach the masking socket to the illuminant ring.

Thanks to the invention a unitary assembly comprising the masking socket and lighter socket calling on a standard lighter socket is formed and the masking socket is simplified as, just like the lighter socket, it is devoid of a threaded portion.

The illuminant ring enables a mounting of the assembly of the masking and lighter sockets through the front or frontal face of the fixed wall. This ring is obtained easily by molding and serves for the hooking of the masking socket and of the above-mentioned assembly.

Furthermore it is not necessary to make any opening in the masking ring since the illuminant ring surrounds the masking ring and directly bears the lighting source. The lighting of the ring of the illuminant ring is thus of better quality.

The attachment means advantageously consist of snap-on means acting between the illuminant ring and the masking socket. For example, the illuminant ring has internally protruding catches able to become engaged in associated openings made in the wall of the masking socket. The lighting ring is therefore in intimate contact with the masking socket.

Thus the assembly comprising the lighter socket and the masking socket is slid by force into the illuminant ring, which enables the masking socket to be attached to the illuminant ring by snapping on.

The free (or front) end of the masking socket is advantageously engaged by being centered in the ring of the illuminant ring. Thus the masking socket is retained a stable manner by the illuminant ring and the attachment means, and also the attachment lugs are carefully treated. The stresses in the illuminant ring are therefore minimized.

Centering means preferably act between the masking socket and the lighter socket. For example the masking socket may have lugs obtained by cutting and bending in contact with the wall of the lighter socket and in the vicinity of the open end of the masking socket. These centering means are installed axially between the open end of the masking socket and the attachment means.

Thus a calibrated space is provided between the walls of the lighter and masking sockets so that when the heating plug is introduced or removed, good stability and rigidity of the assembly is obtained with the careful treatment of the attachment device. This type of mounting is therefore reliable and has a long service life.

It allows the attachment means to be carefully treated, a deformation of the lighter socket to be avoided and good parallelism to be maintained between the two sockets even in the event of the heating of the lighter socket.

Furthermore it promotes good ventilation between the sockets.

In an embodiment the illuminant ring removably bears a lighting housing containing a light bulb.

For example the illuminant ring has a slide for mounting the lighting housing in the manner of a drawer. All this is easily performed, as, in a manner known per se, the illuminant ring is made of moldable plastic material.

Angular indexing means advantageously act between the illuminant ring and an electrically insulating washer borne externally by the lighter socket to assist the sliding of the above-mentioned unitary assembly into the illuminant ring and to produce automatically the attachment of the masking socket, the catches of the snap-on means penetrating securely into their associated openings.

BRIEF DESCRIPTION OF THE DRAWING

The following description illustrates the invention by studying the attached drawings in which:

FIG. 3 is a view along arrow 3 of FIG. 1 without the fixed wall;

FIG. 4 is a partial view of the lighter socket showing one of these clearance openings;

FIG. 5 is a partial view along arrow 3 of FIG. 2;

FIG. 6 is a partial view of the base of the power supply blade associated with the masking socket.

DETAILED DESCRIPTION OF THE INVENTION

Figure 1:
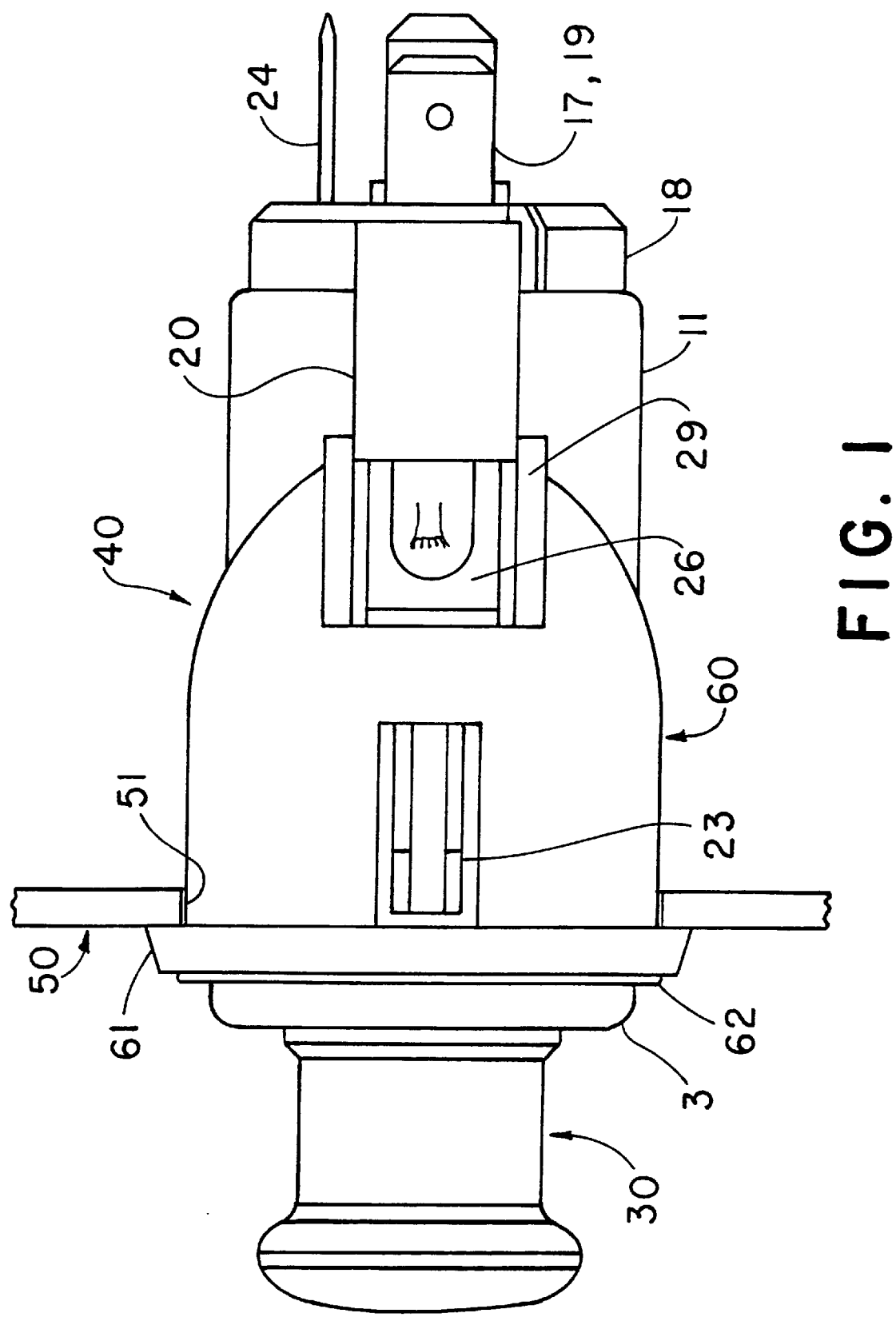
FIG. 1 is a view of a cigar lighter according to the invention mounted on the fixed wall of a motor vehicle.

In these figures a cigar lighter for a motor vehicle is represented, which comprises a removable heating plug 30 and a lighter body 40 forming a receptacle and connector for the plug 30.

The lighter body 40 has an electrically conductive lighter socket 6, closed at the rear by a bottom, an attachment device 14 passing through the said bottom, a connection device 12 mounted inside the socket 6 and electrically connected by the attachment device 14 to a right-angled blade or first power supply part 19 mounted on the outside of the socket 6, a first electrically insulating part 15 placed between the connection device 12 and the bottom of the socket 6, a blade or second power supply part 17 mounted on the outside of the socket 6 whilst being adjacent to the bottom thereof and electrically connected to the socket 6, a washer or second electrically insulating part 18 placed between the first 19 and the second 17 power supply parts, a bimetallic strip or safety element 16 having a generally axially oriented safety blade, capable of producing a short circuit in the event of the overheating of the lighter body 40, the electrically conductive attachment device 14 passing through the electrically insulating parts 15, 18 for assembly of the power supply parts 19, 17 of the connection device 12, and of the safety element 16.

The parts 6, 12, 14, 16, 17, 19, here metallic, are therefore electrically conductive, whereas the parts 15, 18 are electrically insulating, as they are advantageously made from mouldable plastic material.

More precisely, here the attachment device 14 consists of a metallic screw, as a variant of a rivet, the connection device 12 is a bimetallic strip, the parts 17, 19 consist of generally axially oriented blades, here on a base of copper, and the safety element 16 is a bimetallic strip mounted head to tail in relation to the bimetallic strip 12 whilst being separate therefrom.

These bimetallic strips 12, 16 have a generally U-shaped section with a disc-shaped base and two generally diametrally opposite and axially oriented blades.

The discs of the bimetallic strips 12, 16 are in contact with one another and the blades of the bimetallic strip 16 pass through the bottom of the socket 6 by means of openings 28, whereas the cylindrical socket 6, here made of deep-drawn sheet, has, opposite the blades of the connecting bimetallic strip 12, two clearance openings 32, which are diametrally opposite and also each delimit a lug 33 (FIG. 4) for the retention of the plug 30 in the waiting position.

The first insulating part 15 forms an axial spacer placed between the base of the bimetallic strip 16 and the bottom of the socket 6.

The second insulating part 18 generally has the shape of a solid washer provided with a central through-opening 31 for the passage of the screw 14 and two lateral through-openings 27 for, firstly, mounting two axially oriented, curved parts 37, which here are convex (FIG. 3), of the second blade 17, and, secondly, the loose housing of the blades of the bimetallic strip 16, the free ends of which have a generally V-shaped section (FIG. 2) for localised contact in the event of short circuit with the convex parts 37, here rounded in an arc shape, of the blade 17.

The opening 31 is stepped for the definition of a shoulder. It is on this shoulder that the base of the right-angled blade 19 bears. This base, parallel to the bottom of the socket 6, is provided centrally with a hole with the formation of a threaded shaft for screwing the end of the screw 14.

The blade 19 therefore forms a nut.

The blade 17 also generally is the shaped as a right angle with a base parallel to that of the blade 19 and to the bottom of the socket 6. The insulating washer 18 therefore forms an axial space between the bases of the blades 17, 19 by means of a bottom delimited by the stepped opening 31.

The washer 18 also has (FIG. 3), generally perpendicularly to the openings 27, an opening for the passage in a complementary manner of the axial part of the blade 17.

The opening 31 also delimits two diametrally opposite grooves, for mounting the axial part, provided with a bend (FIG. 2), of the blade 19, in the manner of a drawer, which blade thus extends perpendicularly in relation to the blade 17.

These blades 17, 19 are immobilised and positioned (by mating engagement) by the washer 18 and protrude axially in relation thereto in the opposite direction to the bottom of the lighter socket 6. These blades 17, 19 are provided with shoulders on the outside of the washer 18.

Figure 2:
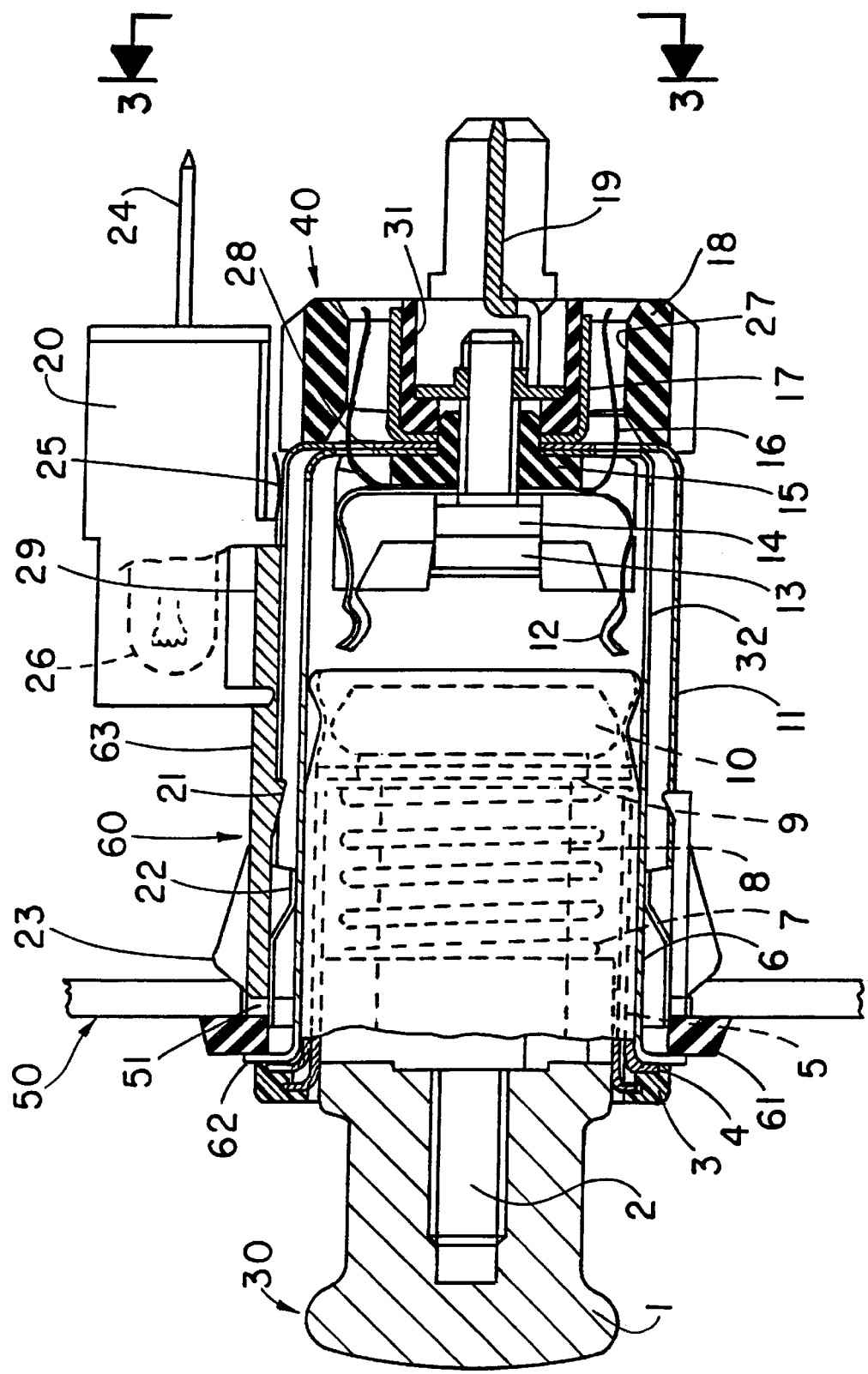
FIG. 2 is a similar axial sectional view corresponding to that of FIG. 1.

The washer 18 therefore also forms a spacer in the transversal direction of FIG. 2 between the blades 17, 19.

The blades of the safety bimetallic strip 16 and the arc-shaped parts 37 of the blade 17 are masked by the washer 18 (FIG. 2) and therefore do not protrude axially in relation to this washer 18.

Each opening 27 also has at its base two arc-shaped grooves (FIG. 3) for mounting the parts 37 by sliding in the manner of a drawer. These parts 37 originate from the base of the blade 17 and extend axially towards the outside so that the attachment end of the blade 17 generally has a U-shaped section with two arc-shaped arms 37. These diametrally opposite parts 37 are in contact with the corresponding lower arc-shaped edge of the opening 27 (FIG. 3).

Each opening 27 thus has (FIGS. 2 and 3) an axially oriented upper edge, chamfered at each of its ends, two parallel lateral edges, generally perpendicular to the upper edge, and an axially oriented arc-shaped lower edge delimited laterally by the mounting grooves of the parts 37, these grooves touching the lateral edges. In normal operation, the blades of the bimetallic strip 16 are each spaced from the lateral and upper edges of the opening 27, and also from the part 37 in question.

It will be appreciated that the chamfers of the upper edges enable, in normal operation, any contact to be avoided between firstly the rounded connecting zone of the blade of the bimetallic strip 16 at its base and the upper edge of the opening 27, and, secondly, between this upper edge and the V-shaped end of the said blade.

According to a characteristic, the base of the blade 17 is here in direct contact with the bottom of a masking socket 11 surrounding the lighter socket 6 to mask its openings 32.

Thus no wire nor cable can touch the blades of the connecting bimetallic strip 12, which may expand through the openings 32, bearing in mind that in a motor vehicle the cigar lighter is installed in a region, for example at the level of the dashboard, where a number of electric cables and wires pass. Thus there is no risk of damaging the wires or cables, of blowing the fuses and/or of causing a fire.

The rear bottom of the electrically conductive masking socket 11, which is here cylindrical and made of deep-drawn sheet, is in contact with the bottom of the lighter socket 6 and the screw 14 passes, with electrical insulation provided, through the bottoms provided centrally with holes for this purpose.

Here the insulating part 15, mounted for the most part in the socket 6, has a central nose passing through the central openings of the bottoms of the sockets 6, 11, the base of the blade 17 provided centrally with a hole for this purpose, to penetrate into the portion of the opening 31 of the washer 18 having a reduced diameter.

This central nose, forming a shaft, is traversed by the screw 14, which allows a clamping assembly of the parts 12, 15, 16, 11, 6, 17, 18, 19 between them.

The outer periphery of this nose has at least one flat portion cooperating with flat portions of a complementary shape made in the coinciding openings of the bottoms of the sockets 6, 11 and of the washer 18, the blades 17 and 19 moreover being immobilized by the washer 18 in the above-mentioned way. Thus a rotational locking, by mating engagement, of the parts 15, 16, 6, 11, 17, 18, 19 is achieved with the clamping of the parts on either side of the bottoms of the sockets 11, 6 thanks to the screw 14.

As a variant, the nose of the insulating part 15 may have a polygonal shape, for example a square shape, and the same applies for the above-mentioned complementary openings.

As a variant, these openings and the nose of the part 15 may be cylindrical, the part 15 laterally having, in a manner known per se, at least one cylindrical point passing in a complementary manner through the bottoms of the sockets 6, 11 and the washer 18.

This point thus also passes through the base of the blade 17 in a complementary or non-complementary manner.

More precisely (FIG. 5) the cylindrical pin or point 129 passes through oblong openings 128 made correspondingly in the sockets 6, 11, the width of the openings 128 being equal, except for the mounting clearance, to the diameter of the point 129 which engages in a U-shaped notch 130 made in the lateral edge of the base of the blade 17 opposite the lateral connecting edge at the axial part of the blade 17.

The bottom of the notch 130 is circular and has an identical radius, except for the mounting clearance, to that of the pin 129. of course the insulating washer 18 is hollowed at this level.

The blade 17, and also the masking socket and the washer 18, are rotationally locked in relation to the lighter socket 6, bearing in mind that the axial part of the blade 17 rotationally immobilizes the washer 18.

Generally, the above-mentioned rotational locking means allow an indexing of the masking socket 11 in relation to the lighter socket 6 and thus the formation of a polarizing slot.

The insulating part 15, here thermally insulating, also allows the bimetallic strips 12, 16 to be loosely positioned, and for this purpose to make the shape of a goblet with an axially oriented skirt directed towards the open end of the socket 6 and a notched bottom for the passage of the blades of the bimetallic strips 16 each passing with clearance though a passage 28 formed by coinciding openings made in the bottoms of the sockets 6, 11.

The nose of the part 15 therefore extends axially in the opposite direction of the locally notched skirt for the passage of the blades of the bimetallic strip 12 and in correspondence with the openings 32. The skirt of the part 15 is also notched for the passage of at least one blade of an additional contact part 13 with the plug 30 when the plug is in the inserted position.

This part 13, having a generally L-shaped section, has an annular base placed between the head of the screw 14 and the base of the connecting bimetallic strip 12.

The elastically deformable blades of the bimetallic strip 12 each have a free hook-shaped end directed towards one another with the result that a clip is formed which is able to cooperate with the cup 10 of the plug 30 to keep it in the heating position.

This electrically conductive cup 10 serves to house a heating body, normally a heating resistor (not visible) described for example in the document FR-A-2 457 787 to which reference will be able to be made for more details. The heating plug 20 does not form part of the invention and will therefore not be described in further detail here.

As a reminder, it will be recalled that this plug 30 is able to occupy a waiting position, in which its ash-guard 4, surrounding the cup 10, comes into engagement by its profiled free end (FIG. 2) with the retention lugs 33 of the socket 6, which have a hook-shaped free end (FIG. 4).

The free end of the ash guard 4 has a collar attached to a ring 3 made of plastic material also allowing, by moulding, the attachment of a collar belonging to a tube-guide 5 with a centrally pierced bottom to form a shaft allowing the guidance of a support tube 8 integral with a core 2, made of electrically and thermally insulating material, having a threaded shank for its attachment to a gripping knob 1 made of electrically insulating material. Here the parts 1, 2 are made of plastic material, like the ring 3, and belong with the tube 8 and the cup 10 to a part which is axially movable in relation to a fixed part comprising the electrically conductive parts 4, 5, connected to one another by the ring 3, the part 4 surrounding the part 5. These parts are movable in relation to one another in opposition to an electrically conductive coil spring 7 placed between the bottom of the tube guide 5 and the dorsal face of the core 2 engaged by force in the tube 8. An electrically insulating washer 9 is placed axially between the bottom of the tube 8 and the bottom of the cup 10 assembled to one another by a rivet (not visible) as described in the document FR-A-2 457 787.

The parts 4, 5, 8 are made of deep-drawn sheet.

When the occupant of the vehicle inserts the gripping knob 1, the cup 10 moves axially on order to separate the blades of the bimetallic strip 12 and come into engagement therewith. An electric circuit is then established to heat the heating resistor of the plug 30, bearing in mind that the blade 19 is normally connected to the positive terminal of the battery, whereas the blade 17 is connected to the negative terminal of the battery.

In this heating position of the plug 30, the electric current is established through the parts 19, 14, 12, 10, 8, 4, 5, 6 and 17 with the result that for a determined temperature of the heating resistor of the plug 30, the blades of the bimetallic strip 12 move apart to free the cup 10, which comes back to its initial position under the action of the spring 7. Then one only has to extract the plug 30 from the lugs 33 in order to light a cigarette, for example.

When, in the heating position of the plug 30, the blades of the bimetallic strip 12 accidentally remain in engagement with the cup 10, abnormal heating is produced, causing the safety bimetallic strip 16 to establish a complete short circuit by localized cooperation of its blades with the parts 37 of the ground blade 17, which causes an overload making the fuse of the cigar lighter blow, thus avoiding a risk of fire bearing in mind that the lighter body 40 is fixed to a fixed wall 50 of the vehicle which is normally made of plastic material, just like the illuminant ring 60 with collar or end ring 61, which the lighter body here has in the manner described below.

The mounting and attachment wall 50 of the lighter body 40 may be the dashboard or a console of the vehicle.

It will be appreciated that the V shape of the end of the blades of the safety bimetallic strip 16, in combination with the parts 37, avoids any sticking of the said blades on the parts 37.

An object may accidentally come into contact with the knob 1 and keep it in the inserted position without the occupant wishing to light a cigarette. This may be, for example, a suitcase or an incorrectly wedged package keeping the knob 1 in the inserted position. In this case a heating of the heating resistor is produced with oscillating phenomena of the connecting bimetallic strip 12.

In fact, these blades move away from the cup 10 for a given temperature of the heating resistor of the plug 30, then come back into contact with the cup 10 as the knob 1 remains wedged owing to the fact that, for example, the case prevents the cup 10 from moving away under the action of the spring 7.

To avoid this, in accordance with a characteristic the cup 10 is allowed, when the knob 1 is inserted, to cooperate with the axial blade of the electrically conductive additional contact part 13. This part 13 is connected electrically to the terminal of the battery via the screw 14. Thus another direct electric circuit is established independently of the oscillations of the bimetallic strip 12, the blades of which are allowed to come into contact with the cup 10 and to move away therefrom in the above-mentioned manner.

As the base of this part 13 is placed between the head of the screw 14 and the disc of the bimetallic strip 12, when the knob 1 remains accidentally inserted in the above-mentioned manner, by heating an intervention of the safety bimetallic strip 16 is produced, the blades of which contract to come into contact with the parts 37 of the blade 17. Then a complete short circuit is produced, which makes the safety fuse of the cigar lighter blow. Thus the running down of the battery is avoided.

Of course the axial position of the contact part 13 is determined according to the applications.

Generally this blade is axially set back in relation to the hooks of the bimetallic strip 12 and has a deformed free end for localised contact with the cup 10 of the plug 30.

It will be noted that the nature of the material of the bimetallic strip 16 and also its thickness depend on the applications, the bimetallic strip 16 here being made from a material which differs from that of the connecting bimetallic strip 12. The material of the bimetallic strip 16 is therefore chosen independently of that of the bimetallic strip 12 and the same applies with respect to the thicknesses of the bimetallic strips 12, 16.

The characteristics of this bimetallic strip 16 are chosen so that it is triggered after the normal heating time of the plug 30, for example at the end of 30 seconds to 1 minute.

Thus the safety bimetallic strip 16 has a double function, namely a normal safety function and an additional function to avoid the oscillations of the blades of the connecting bimetallic strip and to treat it carefully to the benefit of its service life.

As is apparent from the evidence of the description and of the drawings, the masking socket 11 has a bottom which is adjacent connected electrically to the bottom of the lighter socket 6.

The bottoms may be in direct contact with one another, but of course as a variant an electrically conductive part may be placed between the assembled bottoms by means of the attachment device 14 of the connecting bimetallic strip 12.

For this purpose, this attachment device 14 passes through the bottoms of the lighter 6 and masking 11 sockets, with electrical insulation being provided, in the above-mentioned manner.

According to a characteristic of the invention, the illuminant ring 60 surrounds the masking socket 11 and has at least one resiliently deformable attachment lug 23 capable of coming into contact (bearing) with the rear face of the fixed wall 50 having an opening 51 traversed by the ring 60 of the sockets 6, 11. The ring 60 is here in intimate contact with the masking socket 11.

Attachment means 21 act between the masking socket 11 and the illuminant ring 60 for the attachment of the masking socket 11 in the illuminant ring 60.

At its open free end the lighter socket 6 has a generally transversally oriented frontal edge 62. This edge, 62, here in the form of a collar, is in contact with the front face of the end ring 61 of the illuminant ring 60. The dorsal or rear face of this ring 61 is in contact (bearing) with the front wall of the fixed wall 50.

The illuminant ring 60 bears a lighting source 26. This ring 60 is, in a manner known per se, made of translucent, indeed even transparent, plastic material and here comprises two diametrally opposite and semi-punched attachment lugs 23 produced by molding.

These lugs 23 are axially oriented and have a triangular wedge shape, the inclined front face of which is able to come into engagement with the rear face of the fixed wall 50. These lugs 23 are therefore resiliently deformable and, after assembly, the fixed wall 50 is sandwiched between the ring 61 of ring 60 and the inclined front faces of the wedges of the lugs 23 thus allowing the clearances to be taken up.

Here the catches or attachment means 21 are installed at the level of the rear end of the illuminant ring 60 (axially beyond the lugs 23 in the direction of the bimetallic strip 12) and consist of catches produced by molding from the cylindrical wall 63 of the illuminant ring 60 and each penetrating into an associated opening made in the wall of the masking socket 11. These notches, which protrude internally in relation to the wall 63 of the ring 60, have an inclined face connected to a generally transversally oriented face forming a shoulder.

Here two catches 21 and thus two associated openings are provided and are diametrally opposite.

Moreover, the masking socket 11 has, by cutting and bending, at least two lugs 22, here diametrically opposite, coming into contact with the wall of the lighter socket 6. These lugs 22 are installed axially between the open end of the masking socket 11 and the attachment means 21 to treat them carefully and also the ring 60.

Thus centering means acting between the masking socket 11 and the lighter socket 6 are created.

Thanks to this arrangement a precise space is created between the walls of the sockets-6 and 11, the said centering means being installed in the vicinity of the lugs 23, i.e. in the vicinity of the open end of the masking socket 11.

Initially the lugs 23 protrude inside the ring 60 previously mounted in the opening 51 of the fixed wall 50. It will be noted that the inclined rear face of the wedges of the lugs 23 is longer than the inclined front locking face of the wedges, with the result that the sliding of the ring 60 into the opening 51 is easy, with the lugs 23 being retracted inwardly during this sliding operation.

Thus a unitary captive assembly may be created, which comprises the sockets 6, 11 with the various components of the cigar lighter especially the bimetallic strips 12, 16 and the blades 17, 19, then this assembly can be slid inside the illuminant ring 60, the lugs 23 of which are automatically raised and locked on contact of the rear face of the fixed wall 50 during this sliding operation; the catches of the attachment means 21 penetrate into the associated openings of the masking socket 11.

As will have been understood, the lighter body can be mounted by the front face of the fixed wall 50 through the opening 51.

Afterwards the lighting source 26 is mounted through the rear. More precisely the lighting source 26, here a bulb, is mounted inside an opaque hosing 20 slid in the manner of a drawer on two axially oriented lugs 29 forming a slide, the lugs 29 being produced by molding with the heel-shaped rear end of the illuminant ring 60.

It will be noted that the bulb 26 has a terminal connected to a power supply blade 24 capable of being connected to the positive terminal of the battery. The blade 25 extends axially parallel to the blade 19.

The housing 20, which here is opaque, bears an elastically deformable curved blade 25 which is able to come into contact with the rear end of the masking socket and with the base of the lamp 26.

It will be noted, after assembly (FIG. 2), that the free (or front) end of the masking socket 11 is engaged in a centered manner (in intimate contact) in the ring 61. This free end is therefore axially displaced in the direction of the bottom of the lighter socket 6 in relation to the collar 62, which as a variation may consist of a rolled edge as disclosed in the above-mentioned document U.S. Pat. No. 2,701,297.

Moreover angular indexing and guide means act between the illuminant ring 60 and the second insulating part 18. These means comprise at least one projection 64, 65 borne by the outer periphery of the washer 18 able to be engaged in axially sliding manner in an associated complementary axial groove in the inner surface of the cylindrical wall of the ring 60.

Here two diametrally opposite projections 64, 65 (FIG. 3) are provided on the inner periphery of the washer 18, so that the risks of wedging are minimized. These projections 64, 65 have a different width for the formation of a polarizing slot.

The projections 64, 65 are divided here into pairs of transversal lugs 64, 65 engaged in corresponding axial grooves (not referenced) of the ring 60.

Of course the groves are advantageously displaced in relation to the catches of the attachment means 21.

Here the grooves are formed at the level of the lugs 23 of the illuminant ring 60. The grooves pass through the slots delimiting the lugs 23. Thus good ventilation is obtained between the two sockets 6, 11 thanks to the centering means 22, to the axial displacement of the free end of the masking socket 11 and to the grooves.

Of course, just one groove and one projection 64, 65 can be provided.

Thus the washer 18 is simply slipped into the said grooves with the result that the catches of the attachment means 21 will automatically come into engagement with their associated openings.

The ring 60 advantageously has a projection 38, here divided into two axial lugs 38, able to engage in a corresponding notch having a U-shaped section and a flat base (visible in broken lines in FIG. 3) made in the edge of the opening 51 of the wall 50.

As a variant, the notch is delimited centrally by a radial lug engaging between the two axial lugs of the ring 60.

Thus the illuminant ring is initially prepositioned and will not rotate during the sliding of the unit comprising the masking socket and the lighter socket, the projection 38 coming from the rear face of the multi-function ring 61.

It will be appreciated that the lugs 23 are flexible by virtue of their great axial length.

The openings for the attachment means are advantageously oblong.

Of course as described in document FR-A-2 436 039 the tongues 23 may extend transversally and the housing 20 may be in a single piece with the illuminant ring 3.

In this case an opening has to be provided in the wall 50 for the passage of the housing 20.

It will be appreciated that use is made of the illuminant ring 60 and that the lighter socket 6 with its blades 17, 19 is of the standard type.

The cigar lighter according to the invention is simple to mount and very safe by virtue of the safety element 16 and of the additional blade 13.

Of course the present invention is not limited to the described exemplified embodiment.

In particular the number of lugs 22 and the number of lugs 23 may be greater than two, with everything depending on applications.

It is possible to invert the structures. Thus the attachment means may comprise lugs originating from the masking socket 11 and penetrating into associated recesses made in the illuminant ring 21.

Similarly the centering lugs 22 may originate from the lighting socket 6. The bimetallic strips 12 and 6 may be made from the same material and have the same thickness or a different thickness according to the applications. The centering nose may be borne by the washer 18 and penetrate into an associated hollow of the first insulating part 15.

The attachment means may be of the bayonet type, especially when the lugs extend transversally, for example points of the masking socket then being engaged in the bayonet grooves of the illuminant ring 60.

The ring 60 may be illuminated indirectly by a lighting source, for example by a light guide.

As will have been understood, the illuminant ring 60 is prepositioned thanks to these lugs 38, in relation to the wall 50.

The masking socket 11 is prepositioned in relation to the lighter socket 6, thanks to rotational locking means, such as the point 129, described above, acting between the two sockets 6, 11 and the washer 18. The masking socket 11 is prepositioned in relation to the illuminant ring thanks to the projections 64, 65 of the washer 18 forming indexing and guide means, i.e. a polarizing slot.

Thus the attachment of the masking socket 11 to the ring 60 is simple and automatic especially when the attachment means 21 are snap-on means.

Of course the presence of the safety bimetallic strip is not obligatory.

This bimetallic strip may be replaced by another safety device.

The structures may be inverted. The safety bimetallic strip may be in contact with the base of the masking socket 11 and be adapted to come into contact with the blade terminal 19.

As a variant just one blade may be provided.

I claim:

1. A lighter body for a lighter comprising an electrically conductive lighter socket, a bimetallic strip having bimetallic blades, an attachment device for fixing the bimetallic strip to the lighter socket, a first insulating part placed between the bimetallic strip and the lighter socket for electrically insulating said bimetallic strip, an electrically conductive masking socket surrounding the lighter socket to mask clearance openings of the lighter socket, and an illuminant ring provided with an end ring having a rear face disposed against a front face of a fixed wall, wherein the masking socket has a bottom mounted to and electrically connected with the bottom of the lighter socket by means of the attachment device, said attachment device passing through the bottoms of the lighter socket and masking socket respectively, and electrically insulated from said lighter socket and said masking socket via the first insulating part, wherein the illuminant ring surrounds the masking socket and has at least one resiliently deformable attachment lug able to come into contact with a rear face of the fixed wall, and wherein additional attachment means act between the masking socket and the illuminant ring for attaching the masking socket to the illuminant ring.

2. A lighter body according to claim 1, wherein the bottom of the masking socket is in direct contact with the bottom of the lighter socket.

3. A lighter body according to claim 2, wherein the front end of the masking socket is engaged by centering to the illuminant ring, and the masking socket directly contacts with the illuminant ring.

4. A lighter body according to claim 1, wherein the front end of the masking socket is engaged by centering to the illuminant ring, and the masking socket directly contacts with the illuminant ring.

5. A lighter body according to claim 4, wherein centering means act between the lighter socket and the masking socket such that the lighter socket is centered within the masking socket.

6. A lighter body according to claim 5, wherein the centering means consist of lugs produced by cutting and bending a portion of the masking socket such that the lugs contact the wall of the lighter socket, the lugs spaced from the attachment lug.

7. A lighter body according to claim 1, wherein angular indexing and guide means act between the illuminant ring and a second electrically insulating part borne externally by the bottom of the lighter socket such that the lighter socket is centered within the masking socket.

8. A lighter body according to claim 7, wherein the angular indexing and guide means have at least one projection borne by the outer periphery of the second electrically insulating part adapted to be engaged with an associated axial groove formed in a wall of the illuminant ring.

9. A lighter body according to claim 8, wherein two projections, divided into pairs of diametrically opposite lugs, are provided at the outer periphery of the second electrically insulating washer, and to form a polarizing slot, the projections have different widths.

10. A lighter body according to claim 1, characterised in that the attachment lug extends axially and has a wedge-shaped section.

11. A lighter body according to claim 1, characterised in that the attachment means consist of snap-on means installed at the rear of the illuminant ring.

12. A lighter body according to claim 11, wherein the illuminant ring internally has catches adapted to be engaged in associated openings provided in the masking socket.

13. A lighter-body according to claim 1, characterized in that the illuminant ring comprises a source.

14. A lighter body according to claim 1, wherein rotational locking means act between the lighter socket and the masking socket such that the lighter socket is centered within the masking socket.

15. A lighter body for a lighter adapted to be mounted into an opening of a fixed wall comprising:

an electrically conductive lighter socket having an open end with a generally transverse edge, a bottom and clearance openings, a bimetallic strip mounted inside the lighter socket and having bimetallic blades located substantially at the level of the lighter socket, an attachment device for fixing the bimetallic strip to the lighter socket, a first insulating part placed between the bimetallic strip and the bottom of the lighter socket for electrically insulating said bimetallic strip, an electrically conductive masking socket surrounding the lighter socket to mask the clearance openings of the lighter socket and an illuminant ring provided with an end ring having a rear face disposed against a front face of the fixed wall and a front face which supports the generally transversal edge of the open end of the lighter socket, wherein the masking socket has a bottom mounted to and electrically connected with the bottom of the lighter socket by means of the attachment device, said attachment device passing through the bottom of the lighter socket and the bottom of the masking socket, and electrically insulated from said lighter socket and said masking socket via the first insulating part, wherein the illuminant ring surrounds the masking socket and has at least one resiliently deformable attachment lug able to come into contact with a rear face of the fixed wall, and wherein additional attachment means act between the masking socket and the illuminant ring for attaching the masking socket to the illuminant ring.

* * * * *